Oct. 5, 1965 W. F. O'GORMAN Re. 25,872

COMBINED LETTERHEAD AND REPLY INSERT

Original Filed April 12, 1963

*INVENTOR.*

William F. O'Gorman

*BY* Bernard X. McGarry

ATTORNEY

United States Patent Office

Re. 25,872
Reissued Oct. 5, 1965

25,872

COMBINED LETTERHEAD AND REPLY INSERT

William F. O'Gorman, Bronx, N.Y., assignor to R & R Printing Corporation, New York, N.Y., a corporation of New York Original No. 3,132,796, dated May 12, 1964, Ser. No. 272,639, Apr. 12, 1963. Application for reissue Mar. 4, 1965, Ser. No. 452,956
8 Claims. (Cl. 229—92.3)

Matter enclosed in heavy brackets [ ] appears in the original patent but forms no part of this reissue specification; matter printed in italics indicates the additions made by reissue.

The present invention is directed to paper products and more particularly to a form or mailing piece employed in the direct mail industry. The form or mailing piece comprises a letterhead carrying a message or advertisement and some means incorporated into the mailing piece for replying to the sender.

This application is a continuation-in-part of my copending application Serial No. 204,133, filed June 21, 1962, now abandoned.

In the direct mail industry, whether for purposes of advertising a product or a service or for requesting contributions and the like, it is often desirable to combine the letter containing the message to the recipient with an insert of some form which may be used in reply to the sender. Various devices for accomplishing this purpose have been used, with a business reply card fitted into a letterhead in some manner probably being the most common. The business reply card usually contains the address of the recipient on one side while the other side is stamped and carries the address of the sender. This device provides a reply means for the recipient's use which requires a minimum amount of effort and time on his part to respond. Of course the type of reply means employed depends on the type of solicitation being made and whether it requires something additional to be returned to the sender in which instance the reply means might be a return envelope.

At the present time when a business reply card is used, it is generally inserted into a pocket or similar receiving arrangement in the letterhead which contains the sender's message. Before the present invention the problem with this arrangement has been that insertion was entirely a hand operation. Hand insertion is relatively slow and as a result, a costly operation. Each card must be placed into its pocket or the like without ripping the pocket or otherwise defacing the letterhead. Further, since the recipient's address on the card also serves as the address for the letterhead and its accompanying window envelope, it must be properly located so that it can easily be seen through the windows in both the letterhead and the envelope. In mass mailings hand insertion is unsuitable both from time as well as cost considerations.

The present invention is intended to overcome the disadvantages inherent in such mailing pieces which require hand insertion of the reply means, it being one of the primary objects of the invention to provide a mailing piece made of a single sheet of paper, which has an essential element a pocket formed integrally with the piece of paper and arranged to receive a reply means adapted to carry both forwarding and return addresses.

It is also a primary object of the present invention to provide a mailing piece containing a pocket into which reply means can be inserted by automatic machinery.

Another object of the invention is to provide a pocket arrangement in a letterhead which will assist in the automatic insertion of the reply means.

A further object is to provide a window-cutout in the mailing piece in register with the pocket which will not interfere with the automatic insertion of the reply means into the pocket.

Moreover, additional objects are to provide a mailing piece which is of a simple construction and is economical to produce.

In practice the present invention affords a mailing piece comprising an elongated sheet of paper having an extension integrally formed with and having a common edge with the sheet of paper. By folding the extension over along the common edge and attaching it to one side of the sheet of paper a pocket is formed. The pocket has an opening through which an addressed insert can be automatically placed in the pocket. Located in the sheet of paper in register with the pocket is a window-cutout through which the address on the insert appears. The window-cutout has at least one edge facing toward the pocket opening which edge is disposed obliquely to the edges of the sheet of paper so that it will not interfere with the placement of the insert into the pocket. Further, glue strips are provided on the extension for attaching it to the sheet of paper and the disposition of the glue strips assist in the automatic insertion of the insert into the pocket.

The various features of novelty which characterize this invention are pointed out with particularity in the claims annexed to and forming a part of this specification. For better understanding of the invention, its operating advantages and specific objects attained by its use, reference should be had to the accompanying drawings and descriptive matter in which we have illustrated and described preferred embodiments of the invention.

Figure 1:
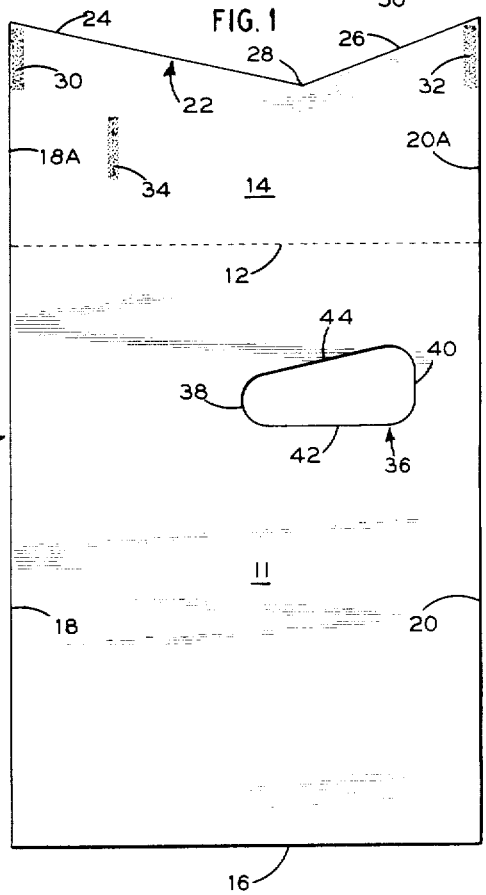
FIG. 1 is a plan view of a mailing piece embodying the present invention before the pocket is formed.

In FIG. 1 there is shown a mailing piece 10 before it is assembled comprising a sheet of paper 11 having a common edge 12 with an extension 14 formed integrally with the sheet of paper. The sheet of paper 11 is rectangular and has about the same or slightly smaller dimensions that a regular 8½ x 11 sheet of business letterhead paper. However, the size of the mailing piece can vary with the particular application to which it is adapted and is not restricted to normal business letterhead size. Opposite the common edge 12 on the sheet of paper 11 is a bottom edge 16 and extending between these opposed edges are a pair of parallel side edges 18 and 20.

As shown in the drawings, the extension is of the same width as the sheet of paper 11 and its side edges 18A and 20A are prolongations of the side edges 18 and 20.

The length of the extension measured along the side edges 18A and 20A is roughly one-third of the length of the sheet of paper 11. Though the extension 14 is illustrated as being of the same width as the sheet of paper it will readily be recognized that its width may vary and is not restricted to this dimension. Edge 22 opposite the common edge 12 is formed in FIG. 2 of two sections 24 and 26 which are in converging relationship with the common edge from the side edges 18A and 20A to an intermediate point 28. This edge 22 may be cut straight across as shown in FIG. 3 instead of having a portion cutout as in FIG. 2.

Glue strips 30, 32 are located along a portion of the side edges 18A and 20A, respectively, near the edge 22. The length of these glue strips 30, 32 may be varied depending upon the circumstances. Between and extending in parallel relationship with the strips 30, 32 is an intermediate glue strip 34 located about halfway between the opposed edges 12 and 22. The distance of the strip from the edges 18A, 20A depends on the size of the pocket to be formed and its distance from the common edge 12 and edge 22 which is an important factor as will more fully be set forth later.

In the sheet of paper 11 and spaced from its edges is a window-cutout 36 having sides 38, 40 disposed in generally parallel relationship with its side edges 18 and 20, respectively. Side 42 extends generally parallel to the common edge 12 while its opposed side 44 forms an oblique angle with the common edge. The window-cutout 36 is arranged so that the distance from its side 42 to the common edge 12 is less than the distance from the common edge to the opposed edge 22 of the extension. Since the window-cutout is ordinarily die-cut its corners are rounded though they could be square cut if required.

Figure 2:
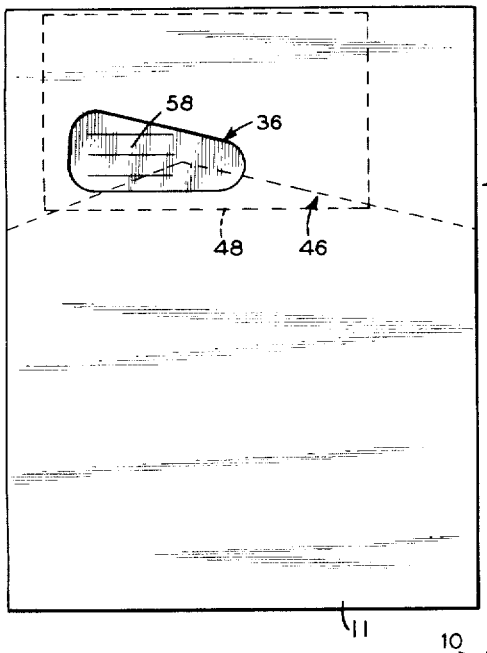
FIG. 2 is a front elevational view of the mailing piece formed from the sheet of paper shown in FIG. 1 with a reply card inserted into its pocket.
Figure 4:
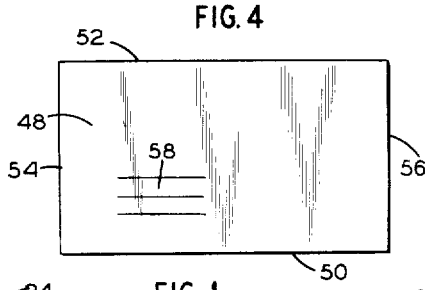
FIG. 4 is a plan view of the reply card which is shown inserted into the pocket of the mailing piece in FIG. 2.
Figure 3:
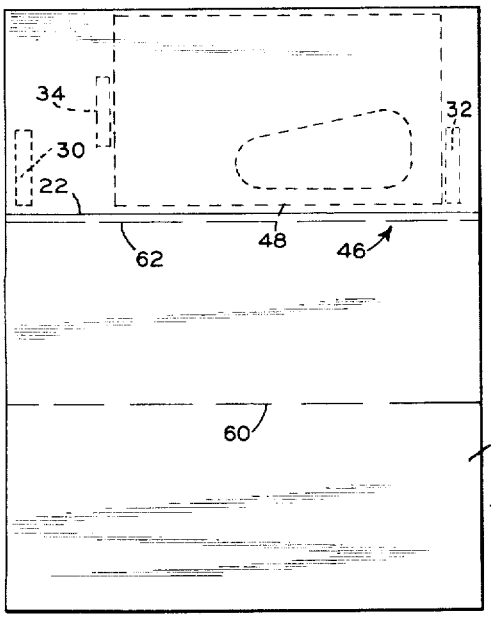
FIG. 3 is a rear view of a mailing piece similar to the one illustrated in FIG. 2.

In FIGS. 2 and 3 a front and rear view, respectively, are given of the mailing piece 10 with the extension 14 folded over, along the common edge 12, upon the back face of the sheet of paper 11 thereby forming a pocket 46 arranged to contain a reply card 48. The reply card has sides 50, 52 which extend in the direction of the opening to the pocket and sides 54, 56 which are disposed at right angles to the opening. In FIG. 3 the glue strips are shown in phantom with strips 32 and 34 securing the opposite sides of the pocket. Within the pocket 46 the reply card 48 is closely spaced from the glue strips 32 and 34. The distance between the adjacent edges of the glue strips 32 and 34 is equal to the distance between the sides 54, 56 of the reply card plus about a quarter of an inch. This allows the card to be held snugly in place in the pocket 46 and assures that the address 58 on the card will remain in position so that it can be viewed through the window-cutout as shown in FIG. 2.

At its corners, remote from the common edge 12, the glue strips 30, 32 securely attach the extension 14 to the sheet of paper 11. However, the intermediate glue strip 34 is located inwardly from the opening to facilitate the automatic insertion of the reply card into the pocket 46. In addition, the intermediate glue strip 34 is also spaced from the common edge 12 so that there is some slack provided in the bottom of the pocket. Without this feature the pocket would be too tight at its bottom making it difficult to insert the card its full depth and perhaps causing the mailing piece to rip when the reply card is removed if it is too tightly secured in the pocket.

As mentioned earlier, hand insertion of the reply card 48 into the pocket 46 is a relatively slow operation and requires considerable tolerances in the size of the pocket with respect to the size of the card since such an operation cannot be performed with the repetitive exactness of automatic insertion. In hand operation, considering the human factor, it is impossible to maintain the same procedure and attitude of the card and pocket for each insertion. However, automatic insertion permits working to close tolerances and the use of a mailing piece construction which would not be advantageous for hand insertion.

One of the primary considerations in automatic insertion is that nothing interfere with the insertion into the pocket of the card, or whatever happens to be the reply means. Considering the speed of automatic insertion and the force with which it is performed, if some part of the mailing piece blocks the insertion of the card into the pocket, either or both the mailing piece and the card will be torn, crimped or otherwise rendered unsightly and useless for its intended purpose.

One of the more probable sources of interference to the insertion of the reply means is the edges 22 of the pocket at its opening. If the intermediate glue strip 34 were located at the very opening to the pocket, it would not leave any slack in the edge 22 and would limit the ability of the pocket to be opened so that the card could be slid into place. However, with the intermediate glue strip spaced back from the opening, the edge can be lifted allowing sufficient tolerance for the card to enter into the pocket.

Another source of interference is the edge of the window-cutout which faces toward the pocket opening. In inserting the card the extension 14 is in a downwardly facing position with the sheet of paper 11 above it. Due to the slack in the mailing piece which permits the pocket to be slightly opened, the edges of the window-cutout will tend to sag or hang down in front of the card as it is fitted into the pocket. This could result in the window-cutout tearing as the card is forced against it. However, this problem is obviated by disposing the edge 44 at an oblique angle to the leading edge of the card and by rounding the corners of the window-cutout. In this manner as the card progresses inwardly, it will lift first the edge 38 and then gradually the edge 44. Since the edge 44 is obliquely arranged, there will not be the likelihood of its interfering with the card as it would if the edge 44 and the leading edge of the card were disposed in parallel relationship where the progressive lifting would not have a chance to take place.

After the reply card is in place within the pocket the mailing piece is ready to be folded for insertion into an envelope. Generally, the mailing piece is inserted into the envelope so that the window-cutout 36 lines up with a corresponding window in the envelope. In this arrangement the address on the reply means serves as the address for the letterhead, and the envelope, and as the sender's address for the reply means. Ordinarily, the pocket is slightly less than one-third of the length of the sheet of paper so that when the mailing piece is folded, the pocket and its insert will not interfere with the fold. Fold lines 60 and 62 shown dashed in FIG. 3 indicate the transverse lines along which the mailing piece is folded. This would be the folding arrangement for an ordinary business size letter, however, the size of the pocket and the location of the fold lines can be adjusted depending on the size of the insert used.

While in accordance with the provisions of the statutes there is illustrated and described herein the best forms and modes of operation of the invention now known to me, those skilled in the art will understand that changes may be made in the forms of the apparatus disclosed without departing from the spirit of the invention covered by the claims, and that certain features of the invention may sometimes be used to advantage without a corresponding use of other features.

What is claimed is:

1. A mailing piece comprising a sheet of paper, an extension attached to and having a common edge with said sheet of paper, said extension having an outer edge spaced from and extending in the same general direction as said common edge and having a pair of spaced side edges extending between said common edge and said outer edge, said extension and said sheet of paper forming a pocket therebetween, a window-cutout located in said sheet of paper in register with said pocket, an insert having an address on one side thereof and positionable within said pocket whereby the address on said insert appears in said window-cutout, an outer adhesive means positioned along each of the side edges of said extension for securing the extension to said sheet of paper, an intermediate adhesive means located between said outer adhesive means, said intermediate adhesive means spaced from both said common edge and from the outer edge of said extension whereby the intermediate adhesive means forms one side of the pocket and facilitates automatic placement of the insert into the pocket, and said window-cutout having at least one edge facing towards the opening to said pocket and disposed obliquely to the edges of said sheet of paper thereby permitting automatic insertion of the insert into said pocket without interference between said edges and insert.

2. A mailing piece as set forth in claim 1 wherein said outer adhesive means and intermediate adhesive means are formed respectively as outer gluing strips and an intermediate gluing strip.

3. A mailing piece comprising a sheet of paper, an extension attached to and having a common edge with said sheet of paper, said extension having an outer edge spaced from and extending in the same general direction as said common edge and having a pair of spaced side edges extending between said common edge and said outer edge, said extension and said sheet of paper forming a pocket therebetween, a window-cutout located in said sheet of paper in register with said pocket, an insert having an address on one side thereof and positionable within said pocket whereby the address on said insert appears in said window-cutout, an outer glue strip positioned along each of the side edges of said extension for securing the extension to said sheet of paper, an intermediate glue strip spaced between said outer glue strips, said intermediate glue strip spaced from both said common edge and the outer edge of said pocket whereby the intermediate glue strip forms one side of the pocket for receiving said insert and facilitates automatic placement of the insert into the pocket by providing the requisite slack both at the entrance to and the base of the pocket.

4. A mailing piece comprising a sheet of paper, an extension attached to and having a common edge with said sheet of paper, said extension having an outer edge spaced from the extending in the same general direction as said common edge and having a pair of spaced side edges extending between said common edge and said outer edge, said extension and said sheet of paper forming a pocket therebetween, a window-cutout located in said sheet of paper in register with said pocket, an insert having an address on one side thereof and positionable within said pocket whereby the address on said insert appears in said window-cutout, an outer adhesive means positioned along each of the side edges of said extension for securing the extension to said sheet of paper, and said window-cutout having at least one edge facing towards the opening to said pocket and disposed obliquely to the edges of said sheet of paper thereby permitting automatic insertion of the insert into said pocket without interference between said edges and insert.

*5. A mailing piece comprising a sheet of paper, an extension attached to and having a common edge with said sheet of paper, said extension having an outer edge spaced from and extending in the same general direction as said common edge and having a pair of spaced side edges extending between said common edge and said outer edge, said extension and said sheet of paper forming a pocket therebetween, a window-cutout located in said mailing piece in register with said pocket, an insert having an address on one side thereof and positionable within said pocket whereby the address on said insert appears in said window-cutout, an outer adhesive means positioned along each of the side edges of said extension for securing the extension to said sheet of paper, an intermediate adhesive means located between said outer adhesive means, said intermediate adhesive means spaced from both said common edge and from the outer edge of said extension whereby the intermediate adhesive means forms one side of the pocket and facilitates automatic placement of the insert into the pocket, and said window-cutout having at least one edge facing towards the opening to said pocket and disposed obliquely to the edges of said sheet of paper thereby permitting automatic insertion of the insert into said pocket without interference between said edges and insert.*

*6. A mailing piece comprising a sheet of paper, said sheet of paper comprising a main portion and an extension portion having a common edge with said main portion, said extension portion having an outer edge spaced from and extending in the same general direction as said common edge and having a pair of spaced side edges extending between said common edge and said outer edge, said main portion and extension portion forming a pocket therebetween, a window-cutout located in said sheet of paper in register with said pocket, an insert having an address on one side thereof and positionable within the pocket whereby the address on said insert appears in said window-cutout, an outer adhesive means positioned along each of the side edges of said extension portion for securing the extension portion to said main portion, an intermediate adhesive means located between said outer adhesive means, said intermediate adhesive means spaced from both said common edge and from the outer edge of said extension portion whereby the intermediate adhesive means forms one side of the pocket and facilitates automatic placement of the insert into the pocket and said window-cutout having at least one edge facing towards the opening to said pocket and disposed obliquely to the edges of said sheet of paper thereby permitting automatic insertion of the insert into said pocket without interference between said edges and insert.*

*7. A mailing piece comprising a sheet of paper, said sheet of paper comprising a main portion and an extension portion having a common edge with said main portion, said extension portion having an outer edge spaced from and extending in the same general direction as said common edge and having a pair of spaced side edges extending between said common edge and said outer edge, said main portion and extension portion forming a pocket therebetween, a window-cutout located in said sheet of paper in register with said pocket, an insert having an address on one side thereof and positionable within said pocket whereby the address on said insert appears in said window-cutout, an outer glue strip positioned along each of the side edges of said extension portion for securing the extension portion to said main portion, an intermediate glue strip spaced from both said common edge and the outer edge of said extension portion whereby the intermediate glue strip forms one side of the pocket for receiving said insert and facilitates automatic placement of the insert into the pocket by providing the requisite slack both at the entrance to and the base of the pocket.*

*8. A mailing piece comprising a sheet of paper, said sheet of paper comprising a main portion and an extension portion having a common edge with said main portion, said extension portion having an outer edge spaced from and extending in the same general direction as said common edge and having a pair of spaced side edges extending between said common edge and said outer edge, said main portion and extension portion forming a pocket therebetween, a window-cutout located in said sheet of paper in register with said pocket, an insert having an address on one side thereof and positionable within said pocket whereby the address on said insert appears in said window-cutout, an outer glue strip positioned along each of the side edges of said extension portion for securing the extension portion to said main portion, and said window-cutout having at least one edge facing towards the opening to said pocket and disposed*

*obliquely to the edges of said sheet of paper thereby permitting automatic insertion of the insert into said pocket without interference between said edges and insert.*

References Cited by the Examiner

The following references, cited by the Examiner, are of record in the patented file of this patent or the original patent.

UNITED STATES PATENTS

| | | | |
|---|---|---|---|
| 1,185,993 | 6/16 | Fujioka. | |
| 2,138,250 | 11/38 | Lee | 229—92.3 |
| 2,335,115 | 11/43 | Gresser | 229—71 |
| 2,559,776 | 7/51 | Larzelere | 229—92.1 |
| 2,967,657 | 1/61 | Kushner | 229—92.3 |
| 3,013,713 | 12/61 | Whitman | 229—73 |

JOSEPH R. LECLAIR, *Primary Examiner.*